United States Patent
Miyamoto

(10) Patent No.: US 10,167,029 B2
(45) Date of Patent: Jan. 1, 2019

(54) RUBBER CRAWLER

(71) Applicant: BRIDGESTONE CORPORATION, Chuo-ku, Tokyo (JP)

(72) Inventor: Ryo Miyamoto, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 106 days.

(21) Appl. No.: 15/313,963

(22) PCT Filed: May 25, 2015

(86) PCT No.: PCT/JP2015/002629
§ 371 (c)(1),
(2) Date: Nov. 24, 2016

(87) PCT Pub. No.: WO2015/190048
PCT Pub. Date: Dec. 17, 2015

(65) Prior Publication Data
US 2017/0183046 A1    Jun. 29, 2017

(30) Foreign Application Priority Data

Jun. 10, 2014 (JP) .................. 2014-119813

(51) Int. Cl.
| | |
|---|---|
| *B62D 55/26* | (2006.01) |
| *B62D 55/24* | (2006.01) |
| *C09J 175/04* | (2006.01) |
| *C08G 18/78* | (2006.01) |
| *C08G 18/79* | (2006.01) |
| *C08G 18/80* | (2006.01) |
| *C08G 18/38* | (2006.01) |

(52) U.S. Cl.
CPC .......... *B62D 55/26* (2013.01); *B62D 55/244* (2013.01); *C08G 18/3876* (2013.01); *C08G 18/7831* (2013.01); *C08G 18/7837* (2013.01); *C08G 18/792* (2013.01); *C08G 18/8025* (2013.01); *C09J 175/04* (2013.01)

(58) Field of Classification Search
CPC ...... B62D 55/24; B62D 55/244; B62D 55/26; C09J 175/04
See application file for complete search history.

(56) References Cited

U.S. PATENT DOCUMENTS 4,390,214 A * 6/1983 Gunter ................. B62D 55/28
152/211
7,866,766 B2 * 1/2011 Berg ................... B62D 55/244
305/165

(Continued)

FOREIGN PATENT DOCUMENTS

| JP | H0196208 A | 4/1989 |
|---|---|---|
| JP | H0423593 U1 | 2/1992 |

(Continued)

*Primary Examiner* — Kip T Kotter
(74) *Attorney, Agent, or Firm* — Kenja IP Law PC

(57) ABSTRACT

A rubber crawler excellent in durability, in which projections are adhered to a crawler main body separately, is provided. The rubber crawler (10) has a crawler main body (1) formed of vulcanized rubber and projections (3) formed of vulcanized rubber, the crawler main body (1) having a ridge (1*c*) on an inner circumferential surface (1*b*), the projections (3) being adhered to the ridge (1*c*) of the crawler main body (1).

15 Claims, 4 Drawing Sheets

(56) References Cited

U.S. PATENT DOCUMENTS

| | | | |
|---|---|---|---|
| 2009/0224598 A1* | 9/2009 | St-Amant | B62D 55/244 305/165 |
| 2011/0109153 A1* | 5/2011 | Berg | B62D 55/244 305/178 |
| 2015/0042152 A1* | 2/2015 | Lussier | B62D 55/125 305/165 |
| 2017/0183046 A1 | 6/2017 | Miyamoto | |

FOREIGN PATENT DOCUMENTS

| | | |
|---|---|---|
| JP | H11129354 A | 5/1999 |
| JP | 2001322577 A | 11/2001 |
| WO | 2015190048 A1 | 12/2015 |

* cited by examiner

RUBBER CRAWLER

TECHNICAL FIELD

This disclosure relates to a rubber crawler.

BACKGROUND

A rubber crawler is known in which a belt-like rubber elastic body as a base (main body) of the crawler, lugs and projections (guides) are respectively subjected to vulcanization molding previously, and are subjected to vulcanization adhesion to be integrated by using an adhering rubber sheet (e.g., see PTL1).

CITATION LIST

Patent Literature

PTL1: JPH11-129354A

SUMMARY

Technical Problem

However, as illustrated in the schematic cross-sectional view in FIG. 4(a), for example, in the case where vulcanization adhesion is performed with an adhesion means M such as an adhering rubber sheet being sandwiched between an inner circumferential surface 21b of a crawler main body 21 and a guide projection 23 which engages with a sprocket or the like of a tracked vehicle, improvement may be necessary in the following points. For example, during cornering of the tracked vehicle, as illustrated with the arrow in the schematic cross-sectional view in FIG. 4B, a load F is applied in a widthwise direction from a track roller (omitted in the drawing) of the tracked vehicle to the guide projection 23, and thus strain occurs in the portion illustrated in the region R in FIG. 4B in a base portion of the guide projection 23. Therefore, as illustrated in FIGS. 4A, 4B, if the adhesion means M is arranged at the same height as the inner circumferential surface 21b of the crawler main body 21, strain is likely to occur in the adhesion means M, which leads to peeling or the like of the adhesion means M.

This disclosure is to provide a rubber crawler excellent in durability, in which projections are adhered to a crawler main body separately.

Solution to Problem

The rubber crawler according to this disclosure has a crawler main body formed of vulcanized rubber and projections formed of vulcanized rubber, the crawler main body having a ridge on at least one of an inner circumferential surface and an outer circumferential surface, the projections being attached via an adhesion means to the ridge of the crawler main body.

According to the rubber crawler according to this disclosure, it is possible to provide a rubber crawler excellent in durability, which has projections adhered to the crawler main body separately.

Advantageous Effect

According to this disclosure, it is possible to provide a rubber crawler excellent in durability, which has separate projections adhered to the crawler main body.

DETAILED DESCRIPTION

In the following, an embodiment of the rubber crawler according to this disclosure and various examples for the production method for the rubber crawler are described in details with reference to the drawings. As used herein, the term "widthwise direction X" refers to the widthwise direction of the endless rubber crawler 1, and the term "circumferential Y" refers to the circumferential direction (extension direction) of the rubber crawler 1. Further, the term "radial direction Z" refers to the direction perpendicular to the widthwise direction X and the circumferential direction Y.

<Rubber Crawler>

Figure 1A:
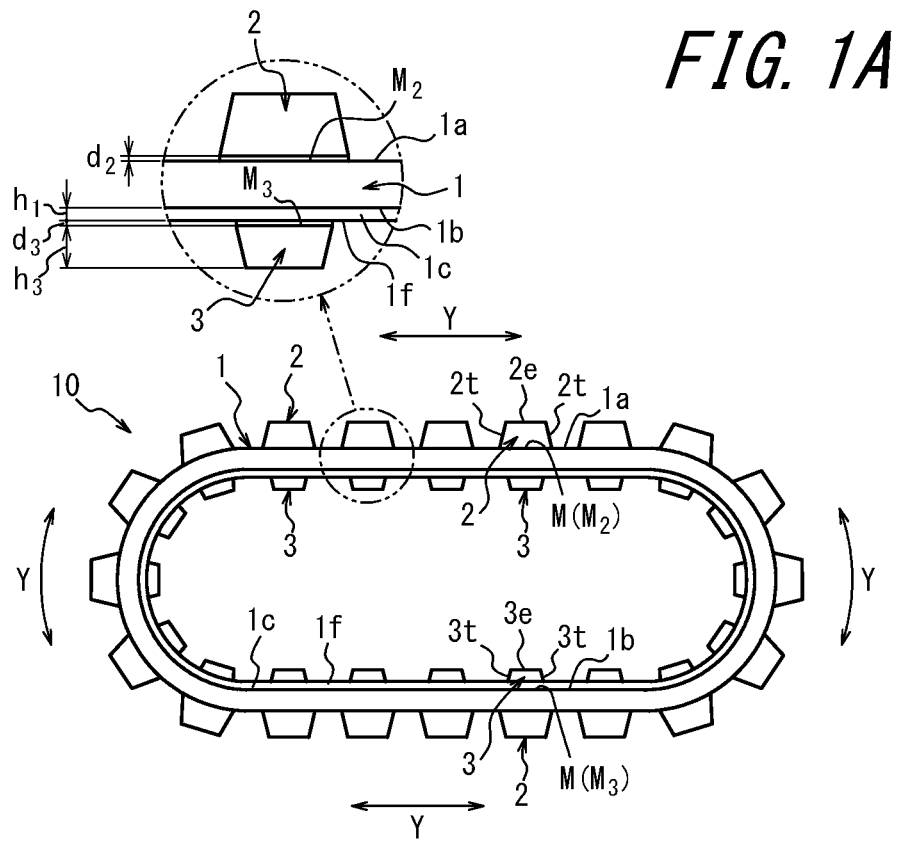
FIG. 1A is a schematic side view of the rubber crawler of an embodiment of this disclosure.

In FIG. 1A, the reference sign 10 denotes a rubber crawler according to an embodiment of this disclosure. The rubber crawler 10 has an endless crawler main body 1 formed of a vulcanized rubber on which, in this embodiment, a plurality of lug projections 2 and a plurality of guide projections 3 formed of vulcanized rubber are adhered via an adhesion means M. The crawler main body 1 is a vulcanization molding product prepared by subjecting unvulcanized rubber to vulcanization molding. As with the crawler main body 1, the lug projections 2 and the guide projections 3 are vulcanization molding products prepared by subjecting unvulcanized rubber to vulcanization molding.

Figure 1B:
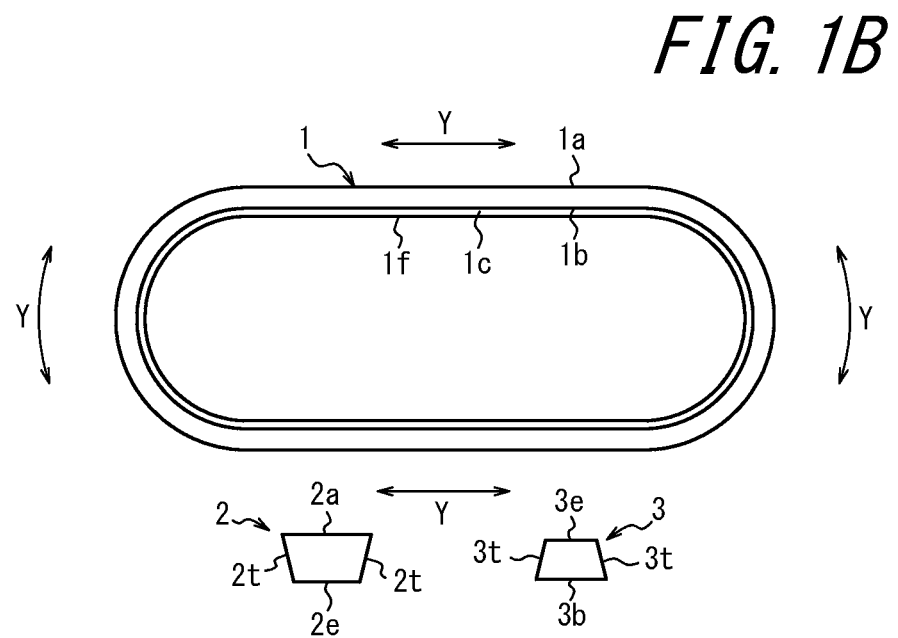
FIG. 1B is a schematic side view of the members of a crawler main body, a lug projection and a guide projection, which are used when producing the rubber crawler shown in FIG. 1A.
Figure 2A:
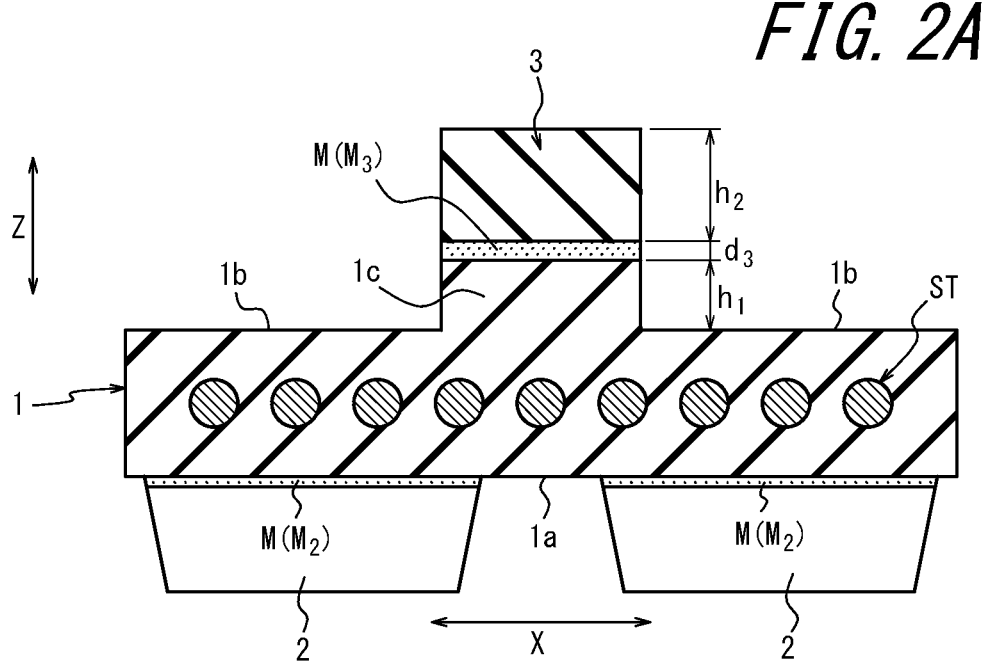
FIG. 2A is a schematic cross-sectional view of the state where the rubber crawler of FIG. 1 is sectioned in the widthwise direction.
Figure 2B:
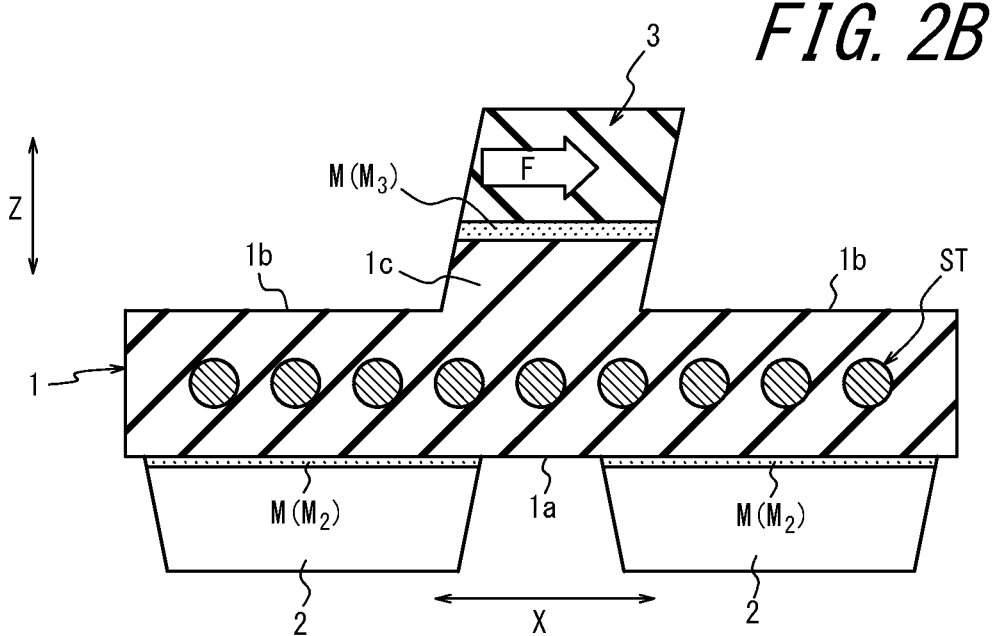
FIG. 2B is a schematic cross-sectional view of the state where the rubber crawler shown in FIG. 2A is applied with a load in the widthwise direction.

More specifically, in FIG. 1B, the crawler main body 1 is a main body of a finished product of the rubber crawler 10. The crawler main body 1 is an endless member obtained by joining both ends of a strip-like member. In the present embodiment, a steel cord layer in which a plurality of steel cords ST extending in the circumferential direction Y are arranged in the widthwise direction X with a constant space therebetween (see FIGS. 2A and 2B) is disposed inside the crawler main body. Moreover, in the present embodiment, as illustrated in FIG. 1B and FIG. 2A, the outer circumferential surface 1a of the crawler main body 1 is formed of a smooth plane having substantially no recesses or projections. In the present embodiment, the outer circumferential surface 1a of the crawler main body 1 is provided with the lug projections 2. The lug projections 2 are adhered to the outer circumferential surface 1a of the crawler main body 1 via an adhesion means M (hereinafter referred also to as an "adhesion means M2"). As illustrated in FIG. 2A, the lug projections 2 of the present embodiment are arranged on both sides of the widthwise direction X with a certain spacing therebetween. Moreover, as illustrated in FIG. 1A, the lug projections 2 are arranged in the circumferential direction Y with a constant spacing therebetween. In the present embodiment, the lug projections 2 respectively function as lugs capable of contacting with the road surface or the like.

As illustrated in FIG. 1B and FIG. 2A, the inner circumferential surface 1b of the crawler main body 1 of the present embodiment is formed of a smooth plane having substantially no recesses or projections as well. In the present embodiment, the inner circumferential surface 1b of the crawler main body 1 becomes a passing surface for a track roller (omitted in the drawing) of the tracked vehicle (track roller passing surface). Moreover, a ridge 1c is arranged on the inner circumferential surface 1b of the crawler main body 1. As illustrated in FIG. 2A, the ridge 1c of the present embodiment is arranged at a central position in the widthwise direction X of the crawler main body 1. The ridge 1c is formed integrally with the crawler main body 1, and protrudes from the inner circumferential surface 1b of the crawler main body 1 toward the inner circumference side in the radial direction Z. Moreover, as illustrated in FIG. 1B, the ridge 1c of the present embodiment extends continuously in the circumferential direction Y, and forms a circular ridge circling the crawler main body 1 in the circumferential direction Y. It is noted that, although the ridge 1c forms a circular ridge in the present embodiment, a plurality of the ridge 1c may also be arranged in the circumferential direction Y on the inner circumferential surface 1b of the crawler main body 1 with a constant spacing therebetween.

As illustrated in FIG. 1A, guide projections (projections) 3 are arranged in the circumferential direction Y on the ridge 1c with a constant spacing therebetween. The guide projections 3 are respectively adhered to the ridge 1c of the crawler main body 1 via an adhesion means M (hereinafter referred also to as "adhesion means M3"). Thereby, as illustrated in FIG. 2A, the adhesion means M3 is located on the inner circumferential side in the radial direction Z with a height h1 from the inner circumferential surface 1b of the crawler main body 1. In the present embodiment, the guide projections 3 form guides engaging with a sprocket or the like of the tracked vehicle together with the ridge 1c of the crawler main body 1. The guides are respectively engaged with the sprocket (omitted in the drawing) of the tracked vehicle, and transfer the torque from the sprocket to the crawler main body 1.

Figure 4A:
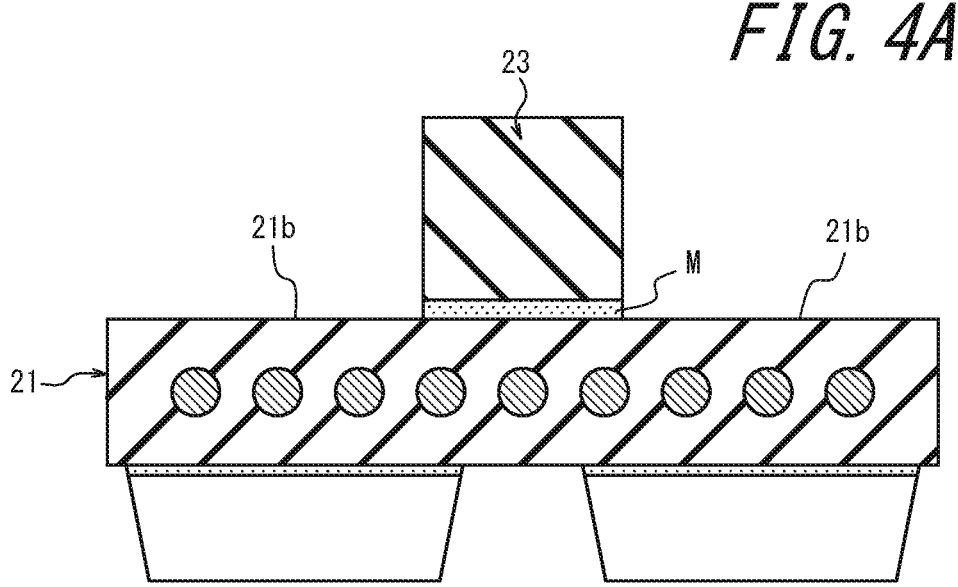
FIG. 4A is a schematic cross-sectional view of the state where a conventional rubber crawler is cut in the widthwise direction.
Figure 4B:
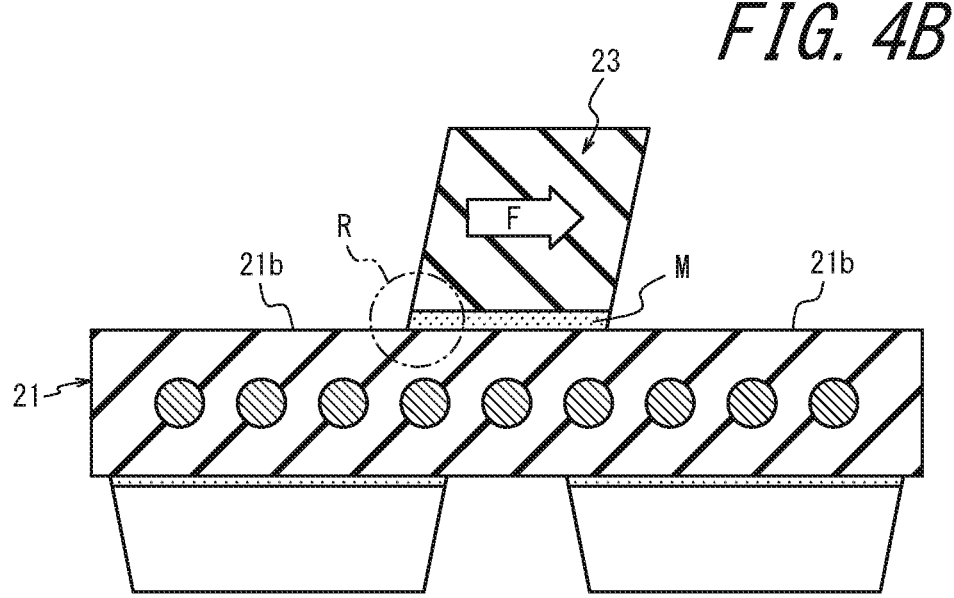
FIG. 4B is a schematic cross-sectional view of the state where the rubber crawler shown in FIG. 4B is applied with a load in the widthwise direction.

The rubber crawler 10 of the present embodiment allows the adhesion means M3 to be disposed at a position different from the inner circumferential surface 1b of the crawler main body 1, so that it is possible to reduce strain occurring in the adhesion means M3, particularly in the present embodiment, the strain occurring in the adhesion layer due to a load F applied in the widthwise direction X from the track roller (omitted in the drawing) of the tracked vehicle, since the base portion (in the present embodiment, the base portion of the ridge 1c, and in the corresponding prior art, the region R in FIG. 4B) of the guides, where stress concentration is the most likely to occur due to the load F is not aligned with the adhesion layer consisting of the adhesion means M3.

Therefore, according to the present embodiment, it is possible to provide a rubber crawler 10 excellent in durability, in which at least one of the lug projections 2 and the guide projections 3 are adhered separately to the crawler main body 1.

When a plurality of steel cords ST are embedded in the crawler main body 1 as in the present embodiment, slight waves (wavy surface) may be generated in the widthwise direction X on the inner circumferential surface 1b of the crawler main body 1. These waves lead to generation of shearing strain. In the present embodiment, the adhesion means M3 is disposed circumferentially inside of the inner circumferential surface 1b of the crawler main body 1, so that such shearing strain can be suppressed. Moreover, by suppressing the shearing strain, the durability of the steel cord ST is improved as well.

As illustrated in FIGS. 1A and 1B, the ridge 1c of the present embodiment extends continuously in the circumferential direction Y to form a circular ridge. This allows for better rubber flow during the molding in a mold as compared to the case where ridges 1c are arranged in the circumferential direction Y with a spacing therebetween to agree with the guide projections 3, so that production of the crawler main body 1 becomes easier. Moreover, the guide projections 3 can be easily attached to the ridge 1c, and thus the production of the rubber crawler becomes easier.

When the rubber crawler is produced with a crawler main body and separate projections, recesses and projections on the crawler main body are reduced, and thus it is possible to suppress prolonged vulcanization molding time and sequence disorder of the steel cords ST due to deteriorated rubber flow, which are caused by recesses and projections formed on the mold. However, it is concerned that the provision of the ridge 1c on the crawler main body 1 as in the present embodiment results in prolonged vulcanization molding time, sequence disorder of the steel cords ST, and the like. In this regard, as illustrated in FIG. 1A, the height (radial length) h1 of the ridge 1c of the crawler main body 1 according to the present embodiment is set smaller (shorter) than the height (radial length) h3 of the guide projections 3. This also allows for suppression of prolonged vulcanization molding time, sequence disorder of the steel cords ST, and the like upon producing the crawler main body 1.

In the present embodiment, only the inner circumferential surface 1b side of the crawler main body 1 adopts the configuration having the ridge 1c of the crawler main body 1 and the guide projections 3. However, ridges may also be provided on the outer circumferential surface 1a side of the crawler main body 1 to form a similar configuration as the guide side 1 together with the lug projections 3.

In this embodiment, the adhesion means M contains a composition capable of bonding with at least one carbon atom in the carbon-carbon bonds existing in the vulcanized rubber. The adhesion means M includes, for example, an adhesive, an adhesive sheet. In the present embodiment, the thickness d2 of the adhesion means M2 is 0.5 mm or less and more than 0 mm (0<d2≤0.5 mm). The range of the thickness d2 is preferably from 10 to 300 μm, and more preferably from 30 to 200 μm. Similarly, in the present embodiment, the thickness d3 of the adhesion means M3 is 0.5 mm or less and more than 0 mm (0<d3≤0.5 mm). The range of the thickness d3 is preferably from 10 to 300 μm, and more preferably from 30 to 200 μm.

Hereinafter, the composition contained in the adhesion means M and the adhesive and the adhesive sheet as an example for the adhesion means M are described.

[Composition]

An example for the composition used in the rubber crawler of this disclosure is compounded of a polythiol compound (A), an isocyanate group-containing compound (B), and a radical precursor (C), and has a ratio of the total mols of isocyanate group contained in the compounded isocyanate group-containing compound (B) to the total mols of thiol group contained in the compounded polythiol compound (A) (isocyanate group/thiol group) of, for example, 0.2 or more and 0.78 or less.

The composition of this disclosure can strongly adhere not only to an unvulcanized rubber but also even to a vulcanized rubber. The reason could be presumed as follows.

It is considered that a part of the polythiol compound (A) and the isocyanate group-containing compound (B) could undergo urethanation reaction, and the composition could be thereby firmly cured. In addition, it is also considered that the other part of the polythiol compound (A) would react with the radical generator (C) to give a thiyl radical, and the thiyl radical would react with the carbon-carbon double bond existing in rubber. It is considered that, through such thiol-ene reaction, the composition can chemically bond to rubber and therefore the composition can strongly adhere to the rubber. In particular, not only unvulcanized rubber but also vulcanized rubber has a carbon-carbon double bond, and therefore it is considered that the composition of this disclosure can strongly adhere to rubber, especially to vulcanized rubber.

It is also considered that, through the hydrogen abstraction reaction from the carbon-carbon bond main chain existing in rubber, the sulfur atom of the thiol group of the polythiol compound (A) and the carbon atom of the carbon-carbon bond could chemically bond. Accordingly, rubber in this disclosure may not necessarily have a carbon-carbon double bond therein.

Hereinafter, the polythiol compound (A), the isocyanate group-containing compound (B), the radical generator (C), the urethanation catalyst (D) and the surface conditioner (E) may also be referred to as a component (A), a component (B), a component (C), a component (D) and a component (E), respectively.

<Polythiol Compound (A)>

In this disclosure, the polythiol compound (A) is a compound having two or more thiol groups in one molecule.

The polythiol compound (A) is not particularly limited, but preferably has from 2 to 6 thiol groups in one molecule, from the viewpoint of improving the adhesiveness.

Moreover, the polythiol compound (A) includes primary, secondary and tertiary ones, but from the viewpoint of improving the adhesiveness, the primary one is preferred.

From the viewpoint of improving the adhesiveness, the molecular weight of the polythiol compound (A) is preferably 3000 or less, more preferably 2000 or less, further more preferably 1000 or less, further more preferably 900 or less, and further more preferably 800 or less. It is noted that, in the case where the polythiol compound (A) is a polymer, the molecular weight refers to the number average molecular weight in terms of styrene.

As such a polythiol compound (A), an aliphatic polythiol optionally containing a hetero atom and an aromatic polythiol optionally containing a hetero atom may be recited, and from the viewpoint of improving the adhesiveness, an aliphatic polythiol optionally containing a hetero atom is preferred.

Here, the aliphatic polythiol optionally containing a hetero atom means an aliphatic compound having two or more thiol groups in one molecule and optionally containing a hetero atom therein. The aromatic polythiol optionally containing a hetero atom means an aromatic compound having two or more thiol groups in one molecule and optionally containing a hetero atom therein.

From the viewpoint of improving the adhesiveness, the hetero atom is preferably at least one selected from oxygen, nitrogen, sulfur, phosphorus, halogen atom, and silicon, more preferably at least one selected from oxygen, nitrogen, sulfur, phosphorus and halogen atom, and even more preferably at least one selected from oxygen, nitrogen and sulfur.

As such an aliphatic polythiol optionally containing a hetero atom, polythiols where the other moiety than the thiol group is an aliphatic hydrocarbon, such as alkanedithiols having from 2 to 20 carbon atoms, polythiols derived from alcohol-halohydrin adducts by substituting the halogen atom therein with a thiol group, polythiols of hydrogen sulfide reaction products of polyepoxide compounds, thioglycolates obtained through esterification of a polyalcohol having from 2 to 6 hydroxyl groups in one molecule with a thioglycolic acid, mercapto-fatty acid esters obtained through esterification of a polyalcohol having from 2 to 6 hydroxyl groups in one molecule with a mercapto-fatty acid, thiol isocyanurate compounds obtained through reaction of an isocyanurate compound and a thiol, polysulfide group-containing thiols, thiol group-modified silicones, thiol-group modified silsesquioxanes may be recited by way of example.

As such a polyalcohol having from 2 to 6 hydroxyl group in the molecule, alkanediols having from 2 to 20 carbon atoms, poly(oxyalkylene) glycols, glycerol, diglycerol, trimethylolpropane, ditrimethylolpropane, pentaerythritol, dipentaerythritol may be recited.

Among the above, from the viewpoint of improving the adhesiveness, more preferred are polythiols where the other moiety than the thiol group is an aliphatic hydrocarbon, polythiols derived from alcohol-halohydrin adducts by substituting the halogen atom therein with a thiol group, polythiols of hydrogen sulfide reaction products of polyepoxide compounds, thioglycolates, mercapto-fatty acid esters and thiol isocyanurate compounds, even more preferred are mercapto-fatty acid esters and thiol isocyanurate compounds, and further more preferred are mercapto-fatty acid esters. From the same viewpoint, more preferred are thiols not containing a polysulfide group and a siloxane bond.

(Polythiols Where the Other Moiety Than Thiol Group is Aliphatic Hydrocarbon)

Examples of the polythiols where the other moiety than the thiol group is an aliphatic hydrocarbon include alkanedithiols having from 2 to 20 carbon atoms.

The alkanedithiols having from 2 to 20 carbon atoms include 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,8-octanedithiol, 1,10-decanedithiol, 1,1-cyclohexanedithiol, 1,2-cyclohexanedithiol, and the like.

(Thioglycolates)

The thioglycolates include 1,4-butanediol bisthioglycolate, 1,6-hexanediol bisthioglycolate, trimethylolpropane tristhioglycolate, pentaerythritol tetrakisthioglycolate, and the like.

(Mercapto-Fatty Acid Esters)

The mercapto-fatty acid esters are preferably mercapto-fatty acid esters having a primary thiol group, from the viewpoint of improving the adhesiveness; and more preferred are β-mercaptopropionates of polyalcohols having from 2 to 6 hydroxyl groups in the molecule. The mercapto-fatty acid esters having a primary thiol group are preferably those in which the number of the thiol groups in one molecule is from 4 to 6, more preferably 4 or 5, even more preferably 4, from the viewpoint of improving the adhesiveness.

The β-mercaptopropionates having a primary thiol group are preferably tetraethylene glycol bis(3-mercaptopropionate) (EGMP-4), trimethylolpropane tris(3-mercaptopropionate) (TMMP), pentaerythritol tetrakis(3-mercaptopropionate) (PEMP), and dipentaerythritol hexakis(3-mercaptopropionate) (DPMP). Of those, preferred are PEMP and DPMP, and more preferred is PEMP.

The β-mercaptopropionates having a secondary thiol group are preferably esters of polyhydric alcohols having from 2 to 6 hydroxyl groups in one molecule and β-mercaptobutanoic acid; specifically, 1,4-bis(3-mercapto butyryloxymethyl) butane, pentaerythritol tetrakis(3-mercapto butyrate), and the like.

(Thiol Isocyanurate Compounds)

The thiol isocyanurate compounds obtained via reaction of an isocyanurate compound and a thiol are, from the viewpoint of improving the adhesion force, preferably thiol isocyanurate compounds having a primary thiol group. As the thiol isocyanurate compounds having a primary thiol group, preferred are compounds having from 2 to 4 thiol groups in one molecule from the viewpoint of improving the adhesiveness, and more preferred are compounds having 3 thiol groups.

The thiol isocyanurate compound having a primary thiol group is preferably tris-[(3-mercaptopropionyloxy)-ethyl]-isocyanurate (TEMPIC).

(Thiol Group-Modified Silicones)

The thiol group-modified silicones include KF-2001, KF-2004, X-22-167B (all trade names by Shin-Etsu Chemical Co., Ltd.), SMS042, SMS022 (both trade names by Gelest), PS849, PS850 (both trade names by UCT), etc.

(Aromatic Polythiols)

As such aromatic polythiols, 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane may be recited.

<Isocyanate Group-Containing Compound (B)>

As such isocyanate group-containing compound (B), aromatic, aliphatic and alicyclic diisocyanates and their modified derivatives may be recited.

As such aromatic, aliphatic and alicyclic diisocyanates, tolylene diisocyanate (TDI), diphenylmethane diisocyanate (MDI), xylylene diisocyanate (XDI), naphthylene diisocyanate (NDI), phenylene diisocyanate (PPDI), m-tetramethylxylylene diisocyanate (TMXDI), methylcyclohexane diisocyanate (hydrogenated TDI), dicyclohexylmethane diisocyanate (hydrogenated MDI), cyclohexane diisocyanate (hydrogenated PPDI), bis(isocyanatomethyl)cyclohexane (hydrogenated XDI), norbornene diisocyanate (NBDI), isophorone diisocyanate (IPDI), hexamethylene diisocyanate (HDI), butane diisocyanate, 2,2,4-trimethylhexamethylene diisocyanate, 2,4,4-trimethylhexamethylene diisocyanate may be recited by way of example.

In the case where the polythiol compound (A) to be blended is a mercapto-fatty acid ester and/or a thiol isocyanurate compound, the isocyanate group-containing compound (B) to be blended is preferably one or more of hexamethylene diisocyanate (HDI), isophorone diisocyanate (IPDI), tolylene diisocyanate (TDI), xylylene diisocyanate (XDI), bis(isocyanatemethyl)cyclohexane (hydrogenated XDI) and diphenylmethane diisocyanate (MDI). Of those, more preferred are one or more of hexamethylene diisocyanate (HDI), isophorone diisocyanate (IPDI), xylylene diisocyanate (XDI), bis(isocyanatomethyl)cyclohexane (hydrogenated XDI) and tolylene diisocyanate (TDI).

As such modified derivatives of aromatic, aliphatic or alicyclic diisocyanates, TMP (trimethylolpropane) adduct-type modified derivatives to be obtained through reaction of a trimethylolpropane and an isocyanate, isocyanurate-type modified derivatives to be obtained through trimerization of an isocyanate, a burette-type modified derivatives to be obtained through reaction of a urea and an isocyanate, an allophanate-type modified derivatives to be obtained through reaction of a urethane and an isocyanate, prepolymers to be obtained through reaction with a polyol and an isocyanate may be recited, and any of these may be suitably used here.

As such TMP adduct-type modified derivatives, the isocyanurate-type modified derivatives, the burette-type modified derivatives and the allophanate-type modified derivatives, the following are preferred from the viewpoint of improving the adhesiveness.

Specifically, as such TMP adduct-type modified derivatives, preferred are TMP adduct-type modified derivatives to be obtained through reaction of TMP and TDI, TMP adduct-type modified derivatives to be obtained through reaction of TMP and XDI, TMP adduct-type modified derivatives to be obtained through reaction of TMP and hydrogenated XDI, TMP adduct-type modified derivatives to be obtained through reaction of TMP and IPDI, TMP adduct-type modified derivatives to be obtained through reaction of TMP and HDI, and TMP adduct-type modified derivatives to be obtained through reaction of TMP and MDI.

As such isocyanurate-type modified derivatives, preferred are isocyanurate-type modified derivatives to be obtained through trimerization of HDI, isocyanurate-type modified derivatives to be obtained through trimerization of IPDI, isocyanurate-type modified derivatives to be obtained through trimerization of TDI, and isocyanurate-type modified derivatives to be obtained through trimerization of hydrogenated XDI.

As such burette-type modified derivatives, preferred are burette-type modified derivatives to be obtained through reaction of urea and HDI.

As such allophanate-type modified derivatives, preferred are allophanate-type modified derivatives to be obtained through reaction of urethane and IPDI.

As such a polythiol compound (A) to be combined with at least one of the above-mentioned TMP adduct-type modified derivatives, isocyanurate-type modified derivatives, burette-type modified derivatives and allophanates-type modified derivatives, preferred are one or two of primary thiol group-having β-mercaptopropionates and primary thiol group-having thiol isocyanurate compounds.

Here, the primary thiol group-having β-mercaptopropionate is preferably at least one of pentaerythritol tetrakis(3-mercaptopropionate) (PEMP) and dipentaerythritol hexakis(3-mercaptopropionate) (DPMP). As such a primary thiol group-having thiol isocyanurate compound, preferred is a primary thiol group-having thiol isocyanurate compound in which the number of the thiol groups in one molecule is 3, and more preferred is tris-[(3-mercaptopropionyloxy)-ethyl] isocyanurate (TEMPIC).

<Radical Generator (C)>

As such a radical generator (C), at least one of a thermal radical generator and a photoradical generator may be used. Of those, from the viewpoint of improving the adhesion force and from the viewpoint that the composition can adhere nontransparent (lightproof) rubber, preferred is a thermal radical generator, more preferred is a thermal radical generator containing a peroxide, and even more preferred is a thermal radical generator containing an organic peroxide.

One of the radical generators (C) may be used alone or two or more thereof may be used in combination.

As such a thermal radical generator containing an organic peroxide, t-butyl 2-ethylperoxyhexanoate, dilauroyl peroxide, 1,1,3,3-tetramethylbutylperoxy-2-ethylhexanoate, 1,1-di(t-hexylperoxy)cyclohexanone, di-t-butyl peroxide, t-butylcumyl peroxide, 1,1-di(t-hexylperoxy)-3,3,5-trimethylcyclohexane, t-amylperoxy-2-ethyl hexanoate, di(2-t-butylperoxyisopropyl)benzene, di(t-butyl)peroxide, 1,1'-di(2-t-butylperoxyisopropyl)benzene, benzoyl peroxide, 1,1'-di(t-butylperoxy)cyclohexane, di(3,5,5-trimethylhexanoyl)peroxide, t-butylperoxy neodecanoate, t-hexylperoxy neodecanoate, dicumyl peroxide may be recited by way of example. Of those, preferred is at least one of t-butyl-2-ethylperoxyhexanoate, dilauroyl peroxide, 1,1,3,3-tetramethylbutylperoxy-2-ethylhexanoate, 1,1-di(t-butylperoxy)cyclohexanone, di-t-butyl peroxide, and t-butylcumyl peroxide. One of the thermal radical generators containing an organic peroxide may be used alone or two or more thereof may be used in combination.

As such a thermal radical generator containing an inorganic peroxide, a redox generator containing a combination of an oxidizing agent and a reducing agent, such as a combination of hydrogen peroxide and an iron(II) salt, a combination of a persulfate and sodium hydrogensulfite may be recited. One of the thermal radical generators containing an inorganic peroxide may be used alone or two or more thereof may be used in combination.

As such a photoradical generator, any known ones may be used here widely with no specific limitation thereon.

One example is an intramolecular-cleaving photoradical generator, which includes a benzoin alkyl ether-type photoradical generator such as benzoin ethyl ether, benzoin isobutyl ether, benzoin isopropyl ether, etc.; an acetophenone-type photoradical generator such as 2,2-diethoxyacetophenone, 4'-phenoxy-2,2-dichloroacetophenone, etc.; a propiophenone-type photoradical generator such as 2-hydroxy-2-methylpropiophenone, 4'-isopropyl-2-hydroxy-2-methylpropiophenone, 4'-dodecyl-2-hydroxy-2-methylpropiophenone, and the like; benzyl dimethyl ketal, 1-hydroxycyclohexyl phenyl ketone; an anthraquinone-type photoradical generator such as 2-ethylanthraquinone, 2-chloroanthraquinone, etc.; an acylphosphine oxide-type photoradical generator, and the like.

Furthermore, as such a hydrogen-drawing photoradical generator, a benzophenone/amine-type photoradical generator, a Michler ketone/benzophenone-type photoradical generator, a thioxanthone/amine-type photoradical generator may be recited. Also, a non-extracting photoradical generator may be used for preventing migration of an unreacted photoradical generator. Examples include a polymerized derivative of an acetophenone-type radical generator, and a benzophenone derivative obtained by adding the double bond of an acrylic group to benzophenone.

One of these photoradical generators may be used alone or two or more thereof may be used in combination.

<Optional Component>

Any optional component may be blended in the composition used in the rubber crawler of this disclosure. As such an optional component, a urethanation catalyst, a surface conditioner, a solvent, a binder, a filler, a pigment dispersant, a conductivity-imparting agent, a UV absorbent, an antioxidant, a drying inhibitor, a penetrant, a pH regulator, a metal sequestering agent, an antibacterial antifungal agent, a surfactant, a plasticizer, a wax, a leveling agent may be recited.

(Urethanation Catalyst (D))

As such an urethanation catalyst (D), any urethanation catalyst may be used. As such an urethanation catalyst, organic tin compounds such as dibutyltin dilaurate, dibutyltin diacetate, dibutyltin thiocarboxylate, dibutyltin dimaleate, dioctyltin thiocarboxylate, tin octenoate, monobutyltin oxide; inorganic tin compounds such as stannous chloride; organic lead compounds such as lead octenoate; amines such as bis(2-diethylaminoethyl)ether, N,N,N',N'-tetramethylhexamethylenediamine, triethylenediamine (TEDA), benzyldimethylamine, 2,2'-dimorpholinoethyl ether, N-methylmorpholine; organic sulfonic acids such as p-toluenesulfonic acid, methanesulfonic acid, fluorosulfuric acid; inorganic acids such as sulfuric acid, phosphoric acid, perchloric acid; bases such as sodium alcoholate, lithium hydroxide, aluminium alcoholate, sodium hydroxide; titanium compounds such as tetrabutyl titanate, tetraethyl titanate, tetraisopropyl titanate; bismuth compounds; quaternary ammonium salts may be recited. Of those, preferred are amines, and more preferred is triethylenediamine (TEDA). One of such catalysts may be used alone or two or more thereof may be used in combination.

(Surface Conditioner (E))

As such a surface conditioner (E), any surface conditioner may be use. As such a surface conditioner, acrylic, vinylic, silicone-based, or fluorine-containing surface conditioner, and the like may be recited. Of those, preferred are silicone-based surface conditioners from the viewpoint of the compatibility and the surface tension-lowering capability thereof.

(Solvent)

The solvent is not specifically limited and may be any one not reacting with the other compounding ingredients, and examples thereof include an aromatic solvent and an aliphatic solvent.

Specific examples of the aromatic solvent include toluene, xylene, and the like. The aliphatic solvent includes hexane, and the like.

<Amount of Each Component>

The ratio of the total molar number of the isocyanate group contained in the isocyanate-containing compound (B) blended to the total molar number of the thiol group contained in the polythiol compound (A) blended to the composition used in the rubber crawler of this disclosure (isocyanate group/thiol group) is preferably from 0.20 to 0.78. When the ratio (isocyanate group/thiol group) is less than 0.20, the composition cannot be fully and firmly cured and the adhesion strength thereof is low. In addition, when the ratio (isocyanate group/thiol group) is more than 0.78, the thiol groups are insufficient, and therefore thiol-ene reaction cannot be sufficiently carried out between the thiol group and the carbon-carbon double bond of a rubber member so that the composition probably cannot be firmly adhered to the rubber member and the adhesion strength thereof can be low. From the same viewpoint, the ratio (isocyanate group/thiol group) is more preferably 0.3 or more and preferably 0.7 or less, and is even more preferably from 0.4 to 0.7.

Here, the total molar number of the thiol group contained in the polythiol compound (A) to be blended can be calculated by multiplying the molar number of the polythiol compound (A) to be blended by the number of the thiol groups that one molecule of the polythiol compound (A) has.

The total molar number of the isocyanate group contained in the isocyanate group-containing compound (B) to be blended can be measured according to the Method B specified in JIS KJ1603-1.

Further, the molar number ratio (isocyanate group/thiol group) may be calculated by dividing the total molar number of the isocyanate group contained in the isocyanate group-containing compound (B) to be blended, as measured in the manner as above, by the total molar number of the thiol group contained in the polythiol compound (A) to be blended.

The ratio of the total molar number of the radical generator (C) to be blended to the total molar number of the thiol group contained in the polythiol compound (A) to be blended (radical generator (C)/thiol group) is preferably 0.025 or more. This can improve the adhesiveness. From this viewpoint, the ratio (radical generator (C)/thiol group) is more preferably 0.03 or more, even more preferably 0.035 or more, still more preferably 0.04 or more. From the viewpoint of improving the adhesiveness, the ratio (radical generator (C)/thiol group) is preferably 0.5 or less, more preferably 0.45 or less, even more preferably 0.4 or less.

As an optional component used in the rubber crawler of this disclosure, a compound containing a carbon-carbon double bond may be blended in the composition. However, when the amount of the carbon-carbon double bond-containing compound blended is too large, then the polythiol compound (A) may react with the carbon-carbon double bond-containing compound. As a result, the thiol-ene reaction between the polythiol compound (A) and the carbon-carbon double bond in rubber would hardly occur, and therefore the adhesion force of the composition to rubber may lower. Otherwise, due to the hydrogen abstraction reaction from the carbon-carbon bond main chain of rubber, the reaction between the sulfur atom of the thiol group of the polythiol compound (A) and the carbon atom of the carbon-carbon bond to chemically bind to each other could hardly occur so that the adhesion force of the composition to rubber may lower. Consequently, the ratio of the total molar number of the carbon-carbon double bond contained in the carbon-carbon double bond-containing compound to be blended, to the total molar number of the thiol group contained in the polythiol compound (A) to be blended (carbon-carbon double bond/thiol group) is preferably less than 0.4, more preferably less than 0.1, even more preferably 0.08 or less, still more preferably 0.05 or less, and most preferably 0.01 or less.

Here, the total molar number of the carbon-carbon double bond contained in the carbon-carbon double bond-containing compound to be blended may be calculated by multiplying the molar number of the compound to be blended by the number of the carbon-carbon double bonds that one molecule of the compound has.

The molar number ratio (carbon-carbon double bond/thiol group) may be calculated by dividing the total molar number of the carbon-carbon double bond contained in the carbon-carbon double bond-containing compound to be blended, as measured in the manner as above, by the total molar number of the thiol group contained in the polythiol compound (A) to be blended.

As described above, the composition used in the rubber crawler of this disclosure may contain any optional component in addition to the indispensable compounds (A) to (C). However, from the viewpoint of strongly adhering to rubber, especially to vulcanized rubber, the total content of the components (A) to (C) in the composition is preferably 80% by mass or more, more preferably 90% by mass or more, even more preferably 95% by mass or more, still more preferably 98% by mass or more.

From the same viewpoint, the total content of the components (A) to (E) is preferably 90% by mass or more, more preferably 95% by mass or more, even more preferably 99% by mass or more, and further more preferably 100% by mass.

[Adhesive]

The adhesive, as an example for the adhesion means M used in production of the rubber crawler of this disclosure, contains the above-mentioned composition. The adhesive may contain any other component than the above-mentioned composition so long as it does not detract the object of this disclosure. However, from the viewpoint of favorably expressing the effects of this disclosure, the content of the composition in the adhesive is preferably 90% by mass or more, more preferably 95% by mass or more, even more preferably 99% by mass or more, and further more preferably 100% by mass.

[Adhesive Sheet]

The adhesive sheet, as another example for the adhesion means M used in production of the rubber crawler of this disclosure, is produced, using the above-mentioned composition.

The adhesive sheet can be favorably obtained by applying the composition onto a release sheet such as a release paper, a release film or the like and keeping the sheet form. It is considered that, during the keeping operation, at least a part of the thiol group and the isocyanate group in the composition could react through thiol-urethanation reaction to give a sheet form. After the coating application, this is left at room temperature and, as a result, an adhesive sheet could be favorably produced. Also, after the coating application, this may be heated in such a manner that the radical reaction would not be started by the radical generator, thereby giving an adhesive sheet.

The ambient temperature or the heating temperature after the coating application is preferably from −30 to 60° C., more preferably from −20 to 40° C., even more preferably from 0 to 40° C.

The total thickness of the release sheet and the composition thereon in the state after the coating application and before leaving or heating operation can be appropriately selected depending on the object of adhesion, the required adhesion strength, or the like, and can be, for example, 1 to 1000 μm, preferably 10 to 300 μm, more preferably 30 to 200 μm.

The standing time may be controlled by the amount of the urethanation catalyst. From the viewpoint of securing good operability in sheet formation and securing good maintenance of the sheet form during adhesion operation, the time is preferably 1 minute or more, more preferably 3 minutes or more, further more preferably 30 minutes or more, even more preferably 60 minutes or more. Although sheet formation can be performed under normal room temperature, the standing temperature may be raised as long as the radical precursor in the material does not cleave. From the viewpoint above, the temperature is preferably 0 to 60° C., more preferably 15 to 40° C. Here, the release sheet is removed when used.

The material of the release sheet is not specifically limited, but transparent resin substrates containing, as the main ingredient thereof, an organic resin, for example, a polyester resin such as polyethylene terephthalate, polycyclohexylene terephthalate, polyethylene naphthalate or the like, a polyamide resin such as nylon 46, modified nylon 6T, nylon MXD6, polyphthalamide or the like, a ketone resin such as polyphenylene sulfide, polythioether sulfone or the like, a sulfone resin such as polysulfone, polyether sulfone or the like, as well as polyether nitrile, polyarylate, polyether imide, polyamideimide, polycarbonate, polymethyl methacrylate, triacetyl cellulose, polystyrene, polyvinyl chloride or the like may be favorably used.

The thickness of the adhesive sheet may be suitably selected depending on the subject to which the sheet is to be adhered, the adhesion strength of the sheet, or the like. For example, the thickness is from 1 μm to 1000 μm, preferably from 10 μm to 300 μm, more preferably from 30 μm to 200 μm. When the adhesive sheet is employed, the adhesive sheet can be used after released from the release sheet or simultaneously with being released from the release sheet.

<Crawler Main Body, Lug Projections and Guide Projections>

The vulcanized rubber constituting the crawler main body 1, the lug projections 2 and the guide projections 3 (hereinafter referred to as "the crawler main body 1, etc.") preferably has a carbon-carbon double bond. In this case, it is presumed that the carbon atom of the carbon-carbon double bond contained in the vulcanized rubber may form a carbon-sulfur bond along with, for example, the sulfur atom of the thiol group contained in the adhesion means M.

However, it is presumed that, even though the vulcanized rubber does not have a carbon-carbon double bond, the crawler main body 1, etc. could be obtained. As mentioned above, it is presumed that, owing to the hydrogen abstraction reaction from the carbon-carbon bond main chain existing in the vulcanized rubber by the polythiol compound (A), the sulfur atom of the thiol group in the polythiol compound (A) could chemically bind to the carbon atom of the carbon-carbon bond. However, from the viewpoint of improving the adhesion force, it is desirable that the vulcanized rubber has a carbon-carbon double bond.

The material of the vulcanized rubber is not specifically limited. For example, preferred are natural rubber; conjugated dienic synthetic rubber such as polyisoprene synthetic rubber (IR), polybutadiene rubber (BR), styrene-butadiene copolymer rubber (SBR), acrylonitrile-butadiene rubber (NBR), chloroprene rubber (CR), butyl rubber (IIR); as well as ethylene-propylene copolymer rubber (EPM), ethylene-propylene-diene copolymer rubber (EPDM), polysiloxane rubber. Of those, preferred are natural rubber and conjugated dienic synthetic rubber. The rubber components may be used alone or two or more thereof may be used in combination.

<Production Method for Rubber Crawler (Using the Adhesive)>

Next, a production method for a rubber crawler 10 using the adhesive as an example of the adhesion means M is described below with reference to FIG. 1(b).

In the production method of the present embodiment, first, a crawler main body 1 formed of a vulcanized rubber having a ridge 1c is prepared, and a plurality of lug projections 2 and guide projections 3 similarly formed of a vulcanized rubber are prepared respectively. Next, the plurality of lug projections 2 are adhered to the outer circumferential surface 1a of the crawler main body 1, and the plurality of guide projections 3 are adhered to the adhesion surfaces if of the ridge 1c protruding from the inner circumferential surface 1b of the crawler main body 1. Specifically, the adhesive is applied to an adhesion surface (adhesive applying surface) 2a, which is to be attached to the crawler main body 1, of the plurality of lug projections 2 previously subjected to vulcanization molding. Next, if needed, after being allowed to stand for a given period of time, the adhesion surface 2a of the lug projections 2 is brought into surface contact with the outer circumferential surface 1a of the crawler main body 1. Similarly, the adhesive is applied to the adhesion surface (adhesive applying surface) 3b, which is to be attached to the ridge 1c, of the crawler main body 1 of the plurality of guide projection 3 previously subjected to vulcanization molding. Next, if needed, after being left for a given period of time, the adhesion surface 3b of the guide projection 3 is brought into surface contact with the adhesion surface if of the ridge 1c of the crawler main body 1. In this way, by arranging the lug projections 2 and the guide projections 3 on the crawler main body 1, a semifinished product of the rubber crawler 10 of the shape as illustrated in FIG. 1(a) is obtained.

If needed, the semifinished product may be then cured while a pressure is applied in the thickness direction thereof to suitably manufacture a rubber crawler 10 as a finished product. In the present embodiment, the adhesive is applied such that the thickness d2 of the adhesion means M2 arranged between the crawler main body 1 and the lug projections 2 is 0.5 mm or less and more than 0 mm ($0<d2\leq0.5$ mm) in the rubber crawler 10 as a finished product. The preferably range of the thickness d2 is from 10 to 300 μm, more preferably from 30 to 200 μm. Therefore, the thickness for applying the adhesive as the adhesion means M2 can be 0.5 mm or less and more than 0 mm. Similarly, in the present embodiment, the adhesive is applied in a manner such that the thickness d3 of the adhesion means M3 arranged between the ridge 1c of the crawler main body 1 and the guide projections 3 is 0.5 mm or less and more than 0 mm ($0<d3\leq0.5$ mm) in the rubber crawler 10 as a finished product. The preferably range of the thickness d3 is from 10 to 300 μm, more preferably from 30 to 200 μm. Therefore, the thickness for coating the adhesive as the adhesion means M3 can be 0.5 mm or less and more than 0 mm.

In the aforementioned production method, in the case where the semifinished product is allowed to stand for a given period of time after the adhesive is applied, the standing time is preferably from 0 to 30 minutes, more preferably from 1 to 15 minutes from the viewpoint that the adhesive can maintains its shape so as not to leak out from the semifinished product during curing.

In the process of manufacturing the semifinished product, the order to install the lug projections 2 and the guide projections 3 is not specifically limited. The adhesive may be applied on the outer circumferential surface 1a of the crawler main body 1 and the adhesion surface 1f of the ridge 1c. Further, the lug projections 2 may be formed integrally with the crawler main body 1. On the outer circumferential surface 1a side of the crawler main body 1, a lug side ridge may be provided on the outer circumferential surface 1a of the crawler main body 1, and the lug projections 2 may be adhered to this ridge as well.

In the case where the semifinished product is given a pressure, the pressure is preferably from 0 MPa to 5 MPa, more preferably from 0 MPa to 2.5 MPa, even more preferably from 0 MPa to 1 MPa, from the viewpoint of improving the adhesion force and from the viewpoint of preventing or retarding the adhesive from leaking out of the semifinished product. Also from the same viewpoints, the pressing time is preferably from 5 minutes to 120 minutes, more preferably from 10 minutes to 60 minutes, even more preferably from 15 minutes to 45 minutes.

In the case where the adhesive contains a thermal radical generator as a radical generator, it is preferable to perform curing by heating. The heating temperature may be suitably selected so that the thermal radical generator could efficiently generate radicals, and is preferably around the one-minute half-life temperature of the thermal radical generator ±30° C.

In the case where the adhesive contains a photoradical generator as a radical generator, it is preferable to cure the body by photoirradiation. As the light source, at least one selected from electromagnetic waves such as UV rays, visible rays, IR rays, X rays; and corpuscular beams such as a rays, γ rays, electron rays may be preferably used from the viewpoint of improving the adhesion force and from the viewpoint of cost reduction, and a UV lamp is more preferably used. Also from the same viewpoints, the photoirradiation time is preferably from a few seconds to several tens of seconds, more preferably from 1 to 40 seconds, even more preferably from 3 to 20 seconds.

The fact that a strong adhesion force can be realized even in the case where the body is cured by heating is advantageous in that the heating method can be employed even in the case where sufficient photoirradiation to the adhesive is difficult.

<Production Method for Rubber Crawler (Using the Adhesive Sheet)>

Next, a production method for the rubber crawler 10 using the adhesive sheet as another example for the adhesion means M is described below.

Referring now to FIG. 1(b), similarly as the case of using an adhesive as the adhesion means M, the composition after the release sheet is released from the adhesive sheet is interposed between the adhesion surface 2a of the lug projections 2 and the outer circumferential surface 1a of the crawler main body 1. Similarly, the composition after the release sheet is released from the adhesive sheet is interposed between the adhesion surface 3b of the guide projections 3 and the adhesion surface 1f of the ridge 1c of the crawler main body 1. In this way, by arranging the lug projections 2 and the guide projections 3 on the crawler main body 1, a semifinished product of the rubber crawler 10 as illustrated in FIG. 1(a) is obtained.

Next, if needed, the semifinished product may be then cured while a pressure is applied in the thickness direction thereof to suitably manufacture a rubber crawler 10 as a finished product. In the case where the semifinished product is given a pressure in the thickness direction thereof, the pressure is preferably from 0.1 MPa to 5.0 MPa, more preferably from 0.2 MPa to 4.0 MPa, even more preferably from 0.3 MPa to 3.0 MPa, from the viewpoint of improving the adhesion force. Still more preferably 0.4 MPa to 3.0 MPa, even still more preferably 0.5 to 3.0 MPa. In the present embodiment also, the adhesive sheet is selected such that the thickness d2 of the adhesion means (composition) M2 arranged between the crawler main body 1 and the lug projections 2 is 0.5 mm or less and more than 0 mm ($0<d2\leq0.5$ mm) in the rubber crawler 10 as a finished product. The preferably range of the thickness d2 is from 10 to 300 μm, more preferably from 30 to 200 μm. Therefore, the thickness for applying the adhesive sheet as the adhesion means M2 can be 0.5 mm or less and more than 0 mm. Similarly, in the present embodiment, the adhesive sheet is selected such that the thickness d3 of the adhesion means (composition) M3 arranged between the ridge 1c of the crawler main body 1 and the guide projections 3 is 0.5 mm or less and more than 0 mm ($0<d3\leq0.5$ mm) in the rubber crawler 10 as a finished product. The preferably range of the thickness d3 is from 10 to 300 μm, more preferably from 30 to 200 μm. Therefore, the thickness for applying the adhesive sheet as the adhesion means M3 can be 0.5 mm or less and more than 0 mm.

Besides these conditions, the pressing condition (pressing time) and the curing condition (heating temperature, heating time, light source, photoirradiation time) are the same as those in the above-mentioned case of using the adhesive.

In a rubber crawler produced by separately adhering the lug projections 2 and/or the guide projections 3, it turns out that the following problem occurred when the thickness of the adhesion portion (the adhesion means M) becomes larger than necessary.

The rubber crawler is an endless track belt, and rotates about a plurality of wheels. When the rubber crawler is rotationally dragged by a drive wheel, a compression stress is generated on the inner circumference side of the rubber crawler, while a tensile stress is generated on the outer circumferential side. Further, after passing a track roller, the bending generated in the rubber crawler disappears. In this way, the rubber crawler is rotationally dragged by the drive wheel and stretched on the track roller surface, so that repeated bending is generated in the rubber crawler. The thickness of the rubber crawler increases as the thickness d2 of the adhesion means (the adhesion portion) M2 and the thickness d3 of the adhesion means (the adhesion portion) M3 increase, and the larger thickness of the rubber crawler leads to higher strain generated on the surface and thus earlier fatigue of the rubber crawler. Moreover, if the thickness d2 of the adhesion means M2 and the thickness d3 of the adhesion means M3 are large, the strain generated in the adhesion means M2 and the adhesion means M3 upon the rubber crawler winding around a sprocket increases, and this increase of strain leads to early fatigue of the adhesion means M2 and the adhesion means M3.

Namely, it was found that the durability of the rubber crawler also depends on the thickness d2 of the adhesion means M2 and the thickness d3 of the adhesion means M3.

In this regard, the thickness of the adhesion means M of the present embodiment is 0.5 mm or less, so that the strain generated in the adhesion portion (in the present embodiment, the adhesion means M2 and M3) of the lug projections 2 and the guide projections 3 within the section of the rubber crawler 10 winding around a wheel can be suppressed.

Further, for example, in a technique for performing vulcanization adhesion, an adhesion rubber containing a large amount of sulfur (unvulcanized rubber) is used as the adhesion means M, and it is difficult to reduce the thickness of the adhesion rubber to 0.6 mm or less for the following reasons:

Reason 1: when the thickness is 0.6 mm or less, it is difficult to mold the rubber with excellent accuracy; and Reason 2: vulcanization adhesion requires a large amount of sulfur blended in the adhesion rubber which is later transferred into the vulcanized rubber to be adhered. Therefore, if the thickness of the adhesion rubber is too small, the absolute amount of sulfur is reduced, and the adhesion strength cannot be maintained.

In this regard, since it is unnecessary to use an adhesion rubber containing a large amount of sulfur, the adhesion means M containing the aforementioned composition is preferably used in order to form the adhesion portion as a film having a thickness of 0.5 mm or less (practically within a range of 0.03 mm to 0.1 mm).

Therefore, by using the production method of the present embodiment, it is possible to suppress the thickness of the adhesion portion (the adhesion means M), and thereby produce a rubber crawler 10 which achieves reduction in size and weight, and excellent durability.

In a technique for performing vulcanization, it is necessary to form recesses and projections on the vulcanization adhesion surface, to achieve an anchor effect. Therefore, it is necessary to form recesses and projections on the vulcanization adhesion surface by performing post-treatment such as buffing and the like to the vulcanization adhesion surface, or using a separate sheet member.

In this regard, when an adhesion means M containing the aforementioned composition is used for the adhesion, post-treatment such as buffing and the like and pretreatment using a separate sheet member, which are necessary for vulcanization adhesion, become unnecessary. Since buffing is unnecessary, manpower necessary for buffing and treatment of buff powder become unnecessary as well. Moreover, since pretreatment using a separate sheet member is unnecessary, for example, material cost for the sheet member, industrial waste cost, manpower for releasing the sheet member become unnecessary.

Therefore, by using the production method of the present embodiment, it is possible to reduce the production cost, the production manpower, and the like.

In the case of using a mold to perform vulcanization molding to the rubber crawler itself, it is necessary to prepare a mold corresponding to the shape of the rubber crawler depending on the shape of the rubber crawler, and it is difficult to produce a rubber crawler having a shape difficult to release from the mold. In this regard, since adhesion is employed, the production method of the present embodiment can eliminate the necessity to prepare a mold corresponding to the shape of the rubber crawler depending on the shape of the rubber crawler, and enables to produce a rubber crawler having a shape difficult to release.

In this way, according to the production method of the present embodiment, it is possible to obtain a rubber crawler 10 without performing integral vulcanization molding by using a mold or vulcanization adhesion.

As mentioned above, the rubber crawler 10 of the present embodiment is a rubber crawler without using vulcanization adhesion. In this case, by suppressing the thickness of the adhesion portion, a rubber crawler can have reduced size and weight, as well as excellent durability. Moreover, since the adhesion is not vulcanization adhesion, a rubber crawler can reduce the production cost and production manpower. Further, since it is unnecessary to use a mold for formation of the rubber crawler as a whole, the rubber crawler can have a shape difficult to release from the mold.

In this way, the rubber crawler 10 of the present embodiment can be produced without performing integral vulcanization molding using a mold or vulcanization.

According to the rubber crawler 10 of the present embodiment, it is unnecessary to use vulcanization adhesion when producing the rubber crawler via adhesion. It is noted that, similarly as the adhesion rubber for vulcanization adhesion, the aforementioned composition used in the present embodiment chemically bonds vulcanized rubbers. Therefore, the adhesion strength is the same as vulcanization adhesion.

The adhesion means M according to this disclosure is not limited to those containing the aforementioned composition, but may be, for example, adhesion rubber (unvulcanized rubber), as mentioned above.

Figure 3:
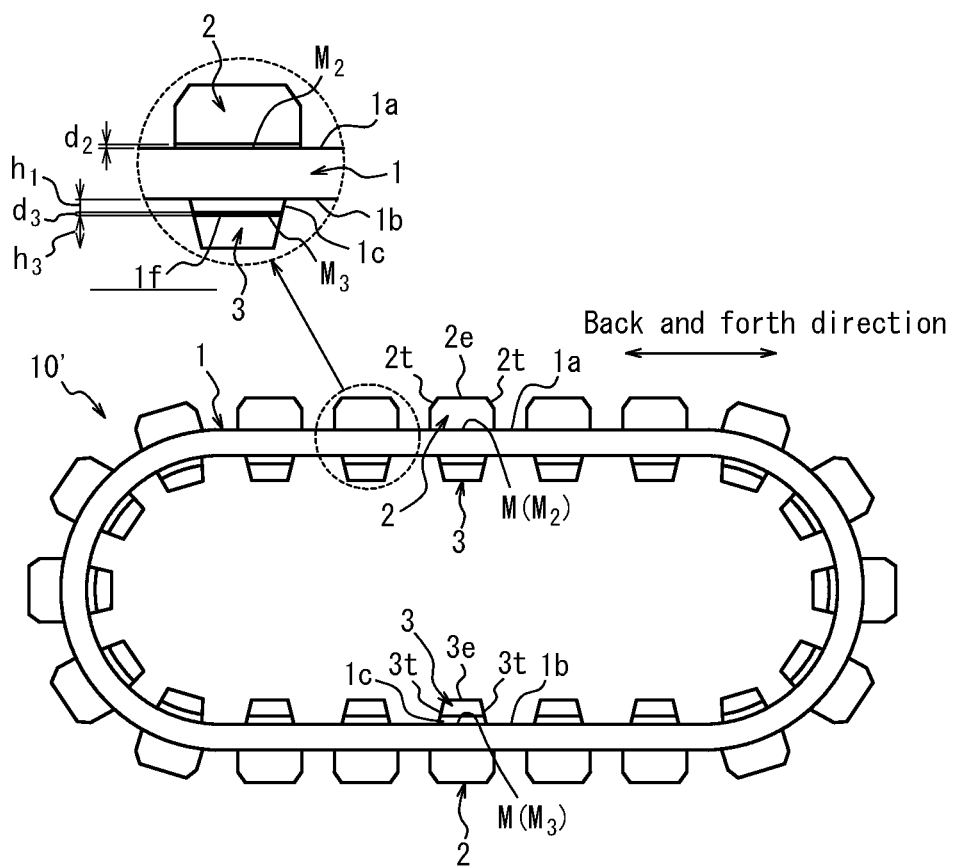
FIG. 3 is a schematic side view of the rubber crawler of another embodiment of this disclosure.

Referring now to FIG. 3, the reference sign 10' denotes a rubber crawler of another embodiment of this disclosure. The rubber crawler 10' is similar as the aforementioned embodiment in the point that a plurality of lug projections 2 and guide projections 3 obtained from vulcanization molding of rubber are adhered via an adhesion means M to a crawler main body 1 obtained from vulcanization molding of rubber. However, the present embodiment is different from the above embodiment in the point that the ridges 1c provided on the crawler main body 1 are spaced from each other in the circumferential direction Y to correspond to the guide projections 3.

In the present embodiment, when the lug projections 2 are adhered to the crawler main body 1, the tip portions of the lug projections 2 are formed in a taper shape. Specifically, as illustrated in FIG. 3, when adhering the lug projections 2 to the crawler main body 1, the taper shape consists of two inclined surfaces 2t arranged in the back and forth direction of the rubber crawler 10'. More specifically, the two inclined surfaces 2t are respectively adjacent to the tips 2e of the lug projections 2, and are locally formed as tip portions of the lug projections 2 facing the side surfaces on the back and forth direction sides. However, similarly as the guide projections 3 mentioned below, the inclined surfaces 2t can be the side faces themselves in the back and force direction sides. Namely, in the present embodiment, when the lug projections 2 are adhered to the crawler main body 1, at least the tip portions of the lug projections 2 are required to have a taper shape formed of two inclined surfaces arranged in the back and forth direction. Moreover, in another embodiment, when the lug projections 2 are adhered to the crawler main body 1, at least the tip portions of the lug projections 2 may be formed into a reversed taper shape in contrast to FIG. 3. Namely, the two inclined surfaces 2t may form a reversed taper shape broadening towards the end, in which the cross section area is enlarged towards the tip 2e. In this case, the scrapability (the hanging property to the contact patch) is increased, which in turn achieves improvement in the driving force.

In the present embodiment, when the guide projections 3 are adhered to the ridge 1c of the crawler main body 1, the guide projections 3 are formed into a taper shape together with the ridge 1c. Specifically, as illustrated in FIG. 3, when the guide projections 3 are adhered to the ridge 1c of the crawler main body 1, the taper shape consists of the two inclined surfaces 3t arranged in the back and forth direction of the rubber crawler 10'. More specifically, the inclined surfaces 3t are adjacent to the tips 3e of the guide projections 3, and are formed as the side faces themselves in the back and forth direction sides. However, similarly as the lug projections 2, the inclined surfaces 3t may be adjacent to the tips 3e of the guide projections 3, and may be locally formed as tip portions of the guide projection 3 facing the side surfaces on the back and forth direction side. Namely, in the present embodiment, when the guide projections 3 are adhered to the crawler main body 1, at least the tip portions of the guide projections 3 are required to have a taper shape formed of two inclined surfaces arranged in the back and forth direction. Moreover, in another embodiment, when the guide projections 3 are adhered to the crawler main body 1, the ridge 1c of the crawler main body 1 and the guide projections 3 may be formed in a manner such that at least the tip portions of the guide projections 3 form a reversed taper shape broadening towards the end, which is formed of two inclined surfaces arranged in the back and forth direction in contrast to FIG. 2. Namely, the two inclined surfaces 3t may form a reversed taper shape broadening towards the end, in which the cross section area is enlarged towards the tip 3e. In this case, since the guide formed of the ridge 1c of the crawler main body 1 and the guide projection can be held firmly on the inner side of the wheel (sprocket), derailment becomes unlikely to occur.

EXAMPLES

The composition contained in adhesion means M used in this disclosure is described in more detail with reference to Examples given below; however, the composition contained in adhesion means M is not whatsoever limited to the following Examples.

[Source Materials and Others]

As the source materials, the following may be used.

<Polythiol Compound (A) (Component (A))>

Pentaerythritol tetrakis(3-mercaptopropionate) (PEMP): manufactured by SC Organic Chemical Co., Ltd.

Dipentaerythritol hexakis(3-mercaptopropionate) (DPMP): manufactured by SC Organic Chemical Co., Ltd.

Tris-[(3-mercaptopropionyloxy)-ethyl]isocyanurate (TEMPIC): manufactured by SC Organic Chemical Co., Ltd., trade name "TEMPIC"

<Isocyanate Group-Containing Compound (B) (Component (B))>

HDI burette-modified isocyanate: manufactured by Sumitomo Bayer Urethane Co., Ltd., trade name "Desmodur N3200"

HDI isocyanurate-modified isocyanate: manufactured by Nippon Polyurethane Industry Co., Ltd., trade name "Coronate HXLV"

IPDI isocyanurate-modified isocyanate: manufactured by Sumitomo Bayer Urethane Co., Ltd., trade name "Desmodur Z4470BA"

IPDI allophanate-modified isocyanate: manufactured by Sumitomo Bayer Urethane Co., Ltd., trade name "Desmodur XP2565"

TDI TMP adduct-modified isocyanate: manufactured by Sumitomo Bayer Urethane Co., Ltd., trade name "Desmodur L75(C)"

TDI isocyanurate-modified isocyanate: manufactured by Mitsui Chemical Polyurethanes, Inc., trade name "D-204"

XDI TMP adduct-modified isocyanate: manufacture by Mitsui Chemical Polyurethanes, Inc., trade name "D-110N"

H6XDI TMP adduct-modified isocyanate: manufactured by Mitsui Chemical Polyurethanes, Inc., trade name "D-120N"

H6XDI isocyanurate-modified isocyanate: manufactured by Mitsui Chemical Polyurethanes, Inc., trade name "D-127N"

IPDI: manufactured by Evonik Degussa Japan Co., Ltd. trade name "VESTANAT IPDI", having functional group equivalent of 111

<Radical Generator (C) (Component (C))> t-Butyl 2-ethylperoxyhexanoate: manufactured by NOF Corporation, trade name "Perbutyl O"

Dilauroyl peroxide: manufactured by NOF Corporation, trade name "Peroyl L"

1,1,3,3-Tetramethyl butyl peroxy-2-ethylhexanoate: manufactured by NOF Corporation, trade name "Perocta O"

1,1-Di(t-hexyl peroxy)cyclohexanone: manufactured by NOF Corporation, trade name "Perhexa HC"

Di-t-butyl peroxide: manufactured by NOF Corporation, trade name "Perbutyl D"

t-Butyl cumyl peroxide: manufactured by NOF Corporation, trade name "Perbutyl C"

<Urethanation Catalyst (D) (Component (D))>

Triethylenediamine (TEDA): manufactured by Air Products and Chemicals, Inc., trade name "DABCO 33LV catalyst"

<Surface Conditioner (E) (Component (E))>

Mixture of polyether-modified polydimethylsiloxane and polyether: manufactured by BYK Japan KK, trade name "BYK-307", content 100%

Using these, it is possible to obtain sufficient adhesion force.

INDUSTRIAL APPLICABILITY

This disclosure can be applied to a rubber crawler having lugs and guides on the crawler main body.

REFERENCE SIGNS LIST 1 crawler main body
1a outer circumferential surface
1b inner circumferential surface
1c ridge
1f adhesion surface
2 lug projection (projection)
2a adhesion surface
2e tip
2t inclined surface
3 guide projection (projection)
3b adhesion surface
3e tip
3t inclined surface
10 rubber crawler
10' rubber crawler
M adhesion means (adhesive, adhesive sheet)
M2 adhesion means
d2 thickness
M3 adhesion means
d3 thickness
h1 height of ridge
h3 height of projection

The invention claimed is:

1. A rubber crawler, comprising a crawler main body formed of vulcanized rubber, a ridge protruding radially inward from an inner circumferential surface of the crawler main body, an adhesive means entirely located on an inner circumferential surface of the ridge, and projections formed of vulcanized rubber and attached via the adhesion means to the ridge, wherein the inner circumferential surface of the ridge and the adhesive means have the same width in a widthwise direction.

2. The rubber crawler according to claim 1, wherein the ridge extends continuously in a circumferential direction of the rubber crawler.

3. The rubber crawler according to claim 2, wherein a height of the ridge is smaller than a height of the projections.

4. The rubber crawler according to claim 3, wherein the adhesion means contains a composition capable of bonding with at least one carbon atom in a carbon-carbon bond existing in the rubber.

5. The rubber crawler according to claim 4, wherein the carbon-carbon bond to be bonded with the composition is at least one selected from carbon-carbon single bond and carbon-carbon double bond.

6. The rubber crawler according to claim 2, wherein the adhesion means contains a composition capable of bonding with at least one carbon atom in a carbon-carbon bond existing in the rubber.

7. The rubber crawler according to claim 6, wherein the carbon-carbon bond to be bonded with the composition is at least one selected from carbon-carbon single bond and carbon-carbon double bond.

8. The rubber crawler according to claim 1, wherein a height of the ridge is smaller than a height of the projections.

9. The rubber crawler according to claim 8, wherein the adhesion means contains a composition capable of bonding with at least one carbon atom in a carbon-carbon bond existing in the rubber.

10. The rubber crawler according to claim 9, wherein the carbon-carbon bond to be bonded with the composition is at least one selected from carbon-carbon single bond and carbon-carbon double bond.

11. The rubber crawler according to claim 1, wherein the adhesion means contains a composition capable of bonding with at least one carbon atom in a carbon-carbon bond existing in the rubber.

12. The rubber crawler according to claim 11, wherein the carbon-carbon bond to be bonded with the composition is at least one selected from carbon-carbon single bond and carbon-carbon double bond.

13. The rubber crawler according to claim 11, wherein the composition is compounded of a polythiol compound (A), an isocyanate group-containing compound (B), and a radical precursor (C).

14. The rubber crawler according to claim 1, wherein the inner circumferential surface of the ridge is formed of a smooth plane.

15. The rubber crawler according to claim 1, wherein the adhesion means has a thickness of 0.5 mm or less.

* * * * *